United States Patent [19]

Croslin

[11] Patent Number: 5,894,566
[45] Date of Patent: Apr. 13, 1999

[54] SYSTEM AND METHOD FOR EMULATING NETWORK OUTAGES A SEGMENTED ARCHITECTURE

[75] Inventor: William D. Croslin, Colorado Springs, Colo.

[73] Assignee: MCI Communications Corporation, Del.

[21] Appl. No.: 08/938,671

[22] Filed: Sep. 26, 1997

[51] Int. Cl.[6] .................................................. G06F 17/00
[52] U.S. Cl. ................................... 395/500; 364/578
[58] Field of Search ............................ 395/500; 379/33, 379/34; 370/241, 242; 340/825.22; 364/578

[56] References Cited

U.S. PATENT DOCUMENTS

| | | | |
|---|---|---|---|
| 5,465,294 | 11/1995 | Chapman, Jr. et al. | 279/207 |
| 5,557,752 | 9/1996 | Remion | 395/285 |
| 5,594,792 | 1/1997 | Chouraki et al. | 379/269 |
| 5,691,973 | 11/1997 | Ramstrom | 370/58.2 |
| 5,727,051 | 3/1998 | Holender | 379/112 |
| 5,748,617 | 5/1998 | McLain, Jr. | 370/244 |
| 5,786,770 | 7/1998 | Thompson | 340/825.06 |
| 5,809,286 | 9/1998 | McLain, Jr. et al. | 395/500 |
| 5,812,826 | 9/1998 | McLain, Jr. | 395/500 |

*Primary Examiner*—Kevin J. Teska
*Assistant Examiner*—A. S. Roberts

[57] ABSTRACT

A network emulator capable of emulating an entire restoration network improves the process of testing a centralized system for monitoring, restoration, and control of the system. The network emulator has a segmented process architecture such that emulation of the aspects of the restoration network is realized with discrete process components, including an alarm generator, an alarm feeder and a communications emulator. The alarm generator reads in a user-defined network event, analyzes network topology data to determine the impact of the event, and generates an alarms file specifying the alarms generated by the emulated network in response to the event. The alarm feeder reads additional user input specifying the nature of the event, reads the alarms file and determines the sequencing and timing of each alarm. The alarm feeder then feeds the alarms, in specific order and time intervals, to the communications emulator. The communications emulator emulates the actual communications of a network with the centralized system being tested. The communications emulator receives the sequenced alarms from the alarm feeder, formats the sequenced alarms into data messages in accordance with the specific type of devices being emulated, and transmits the messages to the centralized system being tested using an appropriate communications protocol.

21 Claims, 6 Drawing Sheets

SYSTEM AND METHOD FOR EMULATING NETWORK OUTAGES A SEGMENTED ARCHITECTURE

CROSS-REFERENCE TO OTHER APPLICATIONS

The following applications of common assignee, incorporated herein by reference in their entireties, contain subject matter that is related to the present application:

U.S. patent application entitled "Method and Apparatus for Emulating a Dynamically Configured Digital Cross-Connect Switch Network", application Ser. No. 08/641,458, filed May 1, 1996.

U.S. patent application entitled "Method and Apparatus for Emulating a Digital Cross-connect Switch Network", application Ser. No. 08/641,459, filed May 1, 1996.

U.S. patent application entitled "Method and Apparatus for Simulating MultiTasking", application Ser. No. 08/641,460, filed May 1, 1996.

U.S. patent application entitled "Method and Apparatus for Emulating a Digital Cross-Connect Switch Network Using a Flexible Topology to Test MSC Network Management", application Ser. No. 08/641,461, filed May 1, 1996.

U.S. patent application entitled "Method and Apparatus for Emulating a Network of State Monitoring Devices", application Ser. No. 08/672,141, filed Jun. 27, 1996.

BACKGROUND OF THE INVENTION

1. Field of the Invention

The present invention provides a system and method for testing a centralized system used to manage network restoration in the event of failure. Specifically, the present invention provides a system and method for segmenting the functions of a network emulator emulating an actual network, by separately receiving and managing information about an event (i.e., a failure) and the nature of the event (i.e., the type of failure).

2. Related Art

A telecommunications network is used to provide numerous services to customers. All users of a network benefit from a quality restoration system. A restoration system is a system that restores service to customers in the event of a network failure.

MCI Telecommunications Corporation, and most other telecommunications service providers, utilize a common transmission network. This transmission network is served by a common restoration system, which has a centralized system responsible for management of the network.

When a connection between two nodes in the network is disconnected, one or more alarms will be received by this centralized system. This centralized system is responsible for monitoring, restoration, and control of the network. A trunk, which provides a given bandwidth of connection capacity, can traverse several nodes. One or more trunks can be physically collocated between two nodes. It is, therefore, possible that a cut in connection between a first node and a second node will generate alarms from several nodes, because several trunks (e.g., fibers) can be disconnected simultaneously.

The nature of the cut in connection can vary. For example, an ax cutting through a trunk may cause simultaneous disconnection of the trunks, and consequently simultaneous generation of alarms at each of the nodes for transmittal to the centralized system. Conversely, it is possible that the alarms will not be detected simultaneously. For example, a fire or an animal gnawing through a trunk can cause sequential disconnections, with each disconnection generating a different set of alarms. As another example, when fiber optic cables are exposed to freezing conditions, the fibers may freeze or thaw in atypical patterns, causing alarms to be generated in a bizarre pattern.

The response of the centralized system can vary. As one example, the response may be to report the alarms to someone, to consolidate the alarms and indicate the location of the failure. As another example, the response may be to consolidate the alarms, isolate the failure, generate a restoral route, and issue commands to other devices in the network to shift the traffic (i.e., to get it away from the failure point). This latter restoration of network function is typically a preferred response.

All services of the telecommunications services provider are enhanced by the successful operation of the restoration system, particularly the successful operation (i.e., including speed and accuracy) of the centralized system. This requires that the centralized system be thoroughly tested throughout its continuous development life cycle.

Certain types of nodes, namely nodes that are switching devices, are used to provide restoration capability. In the event of a network outage, these devices re-route impacted traffic to circumvent the outage, using spare network capacity. One such device is a Digital Cross-Connect for DS-3 trunks (DXC 3/3). The devices and interconnecting network capacity that are used for restoring traffic are collectively referred to as a restoration network.

The restoration network employs the centralized system to restore network function. Typically, the centralized system is a computer system that is connected to each device, or node, in the restoration network, performing many functions, such as the mentioned functions of monitoring the restoration network, performing restoration analysis in the event of an outage, and controlling the restoration network to produce a restoration of traffic.

The centralized system, itself, is typically subject to continual improvements. In addition to the initial roll-out of the centralized system, the telecommunications service provider typically introduces several versions each year. These versions include new features and capabilities, as well as fixes to software defects, and comprise complex software. As with any complex software system, the centralized system requires extensive testing. In addition to testing the functionality of the centralized system, stress testing is also required to test the centralized system's behavior in a real-world environment.

It is impractical, and sometimes impossible, to use the actual restoration network for testing the centralized system due to the intrusion to live traffic that it would cause. Testing in a non-production, test environment is needed. It is cost-prohibitive, however, to duplicate the actual network in the test environment. This requires extensive time, effort, and physical resources, since a typical restoration network may consist of hundreds of DXC 3/3 nodes, each with multiple links to the centralized system.

To solve this problem, network emulators have been created. As the name implies, network emulators emulate the behavior of the actual network. Network emulators are typically computer programs that run on a single computer. By connecting an emulator to a centralized system that is to be tested, the centralized system can be observed to behave as it would when placed in a real network environment.

3

Unfortunately, known network emulators that are currently capable of emulating an entire network use a monolithic process architecture. The processes of emulating communications links, creating and formatting messages, processing messages, analyzing topology to determine alarm generation, and sequencing alarms, are primarily performed simultaneously. Even though these different functions are realized by discrete software components, during emulation each function is performed simultaneously and must compete for the computing resources of the centralized system.

The design of these known emulators reflects the design of an actual network device. Under operation, the emulator must perform the process of an emulated device repeatedly, hundreds of times in succession. This results in limited performance. While one component of the known emulator is sending alarm messages to the centralized system under test (i.e., the centralized system being tested by the network emulator), another component is analyzing data to determine which alarms to send, and another component is formatting alarm messages. All of these events typically occur simultaneously, using the same CPU and RAM.

Known emulators are also difficult to develop and maintain. Since the software architecture is not segmented by the processes performed, adding or modifying a process requires extensive analysis of software code.

SUMMARY OF THE INVENTION

The present invention provides a system and method for providing a network emulator with segmented functionality. The inventive network emulator, which is capable of emulating an entire restoration network, improves the process of testing a centralized system for monitoring, restoration, and control of the system.

Specifically, the network emulator has a segmented process architecture such that emulation of the aspects of the restoration network is realized with discrete process components. These discrete process components include an alarm generator, an alarm feeder and a communications emulator.

The alarm generator reads in a user-defined network event. It analyzes network topology data to determine the impact of the event. It then generates an alarms file specifying the alarms generated by the emulated network in response to the event.

The alarm feeder reads additional user input specifying the nature of the event. It reads the alarms file generated by the alarm generator. Based on these two items, it determines the sequencing and timing of each alarm. The alarm feeder then feeds the alarms, in specific order and time intervals, into an events file.

The communications emulator emulates the actual communications of a network with the centralized system that is being tested. It receives the sequenced alarms from the events file, which was generated by the alarm feeder. It formats the sequenced alarms into data messages in accordance with the specific type of devices being emulated. Finally, it transmits the messages to the centralized system being tested using an appropriate communications protocol.

Features and Advantages

The present invention overcomes the difficulties of the known emulators and provides the following important features and advantages:

The present invention provides ease and flexibility of use. Using a graphical user interface (GUI), a user can define many different types of events, specify the nature of each event, and run the emulation of the events specified.

For example, a user can define a network event, such as a transmission outage or equipment failure, as well as multiple events. Importantly, a user can then define the nature of each event separately. This includes specifying a full or partial outage, an instant or cascading outage, etc. A full and instant outage can emulate, for example, a backhoe slicing through a fiber cable all at once. A full and cascading outage can emulate, for example, a fire slowly burning through a fiber cable. A partial outage can emulate, for example, a beaver gnawing through a cable. Equipment outages are also possible to emulate.

Because the definition of a network event and the identification of the nature of the event are segmented, a user can separately define one or more events, specify the nature of each event, and finally run emulation for the events. Thus, a user can define an event once, and then specify multiple natures. On the other hand, a user can define an event and specify its nature (or use a default nature) once, then with a single action, the user can run emulation of that event as many times as desired, in order to test different configurations or aspects of the centralized system. A user can also define an event, using the inventive network emulator to perform the analysis needed to generate alarms and feed alarms to a communications emulator, and then perform actual emulation at a later, more desirable time. Hence, because of the segmented architecture of the network emulator, analysis and emulation can be performed separately, allowing for greater flexibility in the use of the network emulator.

The present invention provides increased performance. The architecture of the inventive network emulator is highly conducive to emulating a large network and matching the performance of such a network in terms of speed. Because each function is segmented temporally into a different process, all analyses are performed prior to actual emulation. When emulation begins, the network emulator only has to send messages to the centralized system being tested.

Moreover, the network emulator can send such messages with no other processes competing for the network emulator computer's resources. Therefore, emulation of large volumes of messages, as in a real network, is performed with the same speed as a real network. This results from considerable conservation of the processing resources of the centralized system. Accordingly, because the behavior of the network in response to an event is created prior to emulation and because the process is segmented, alarms can be sent quicker, allowing for closer emulation of a real network.

The inventive network emulator is easy to maintain, modify and augment because of its segmentation of processes. Because of the segmented architecture, any changes to a particular aspect of a restoration network can be easily reflected in the network emulator by modifying the corresponding process component. The addition of devices to a network is easily accomplished by adding the devices to a topology database that is used by the first component of the network emulator.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. An overview

A. The network emulator

The present invention is a network emulator, comprising a computer program and associated processors, that is capable of emulating an entire restoration network. The inventive network emulator is used to test a centralized system for monitoring, restoration, and control. Referred to hereforth as a network emulator, it has a segmented process architecture such that emulation of each aspect of a restoration network is realized with a discrete process component. The network emulator consists of three primary process components, as described below.

B. The alarm generator

A first component, called an alarm generator, reads in a user-defined network event. It analyzes network topology data to determine the impact of the event. Finally, it generates a file (alarms file) specifying the alarms generated by the emulated network in response to the event. As will be recognized by those skilled in the art, the alarm generator can be any combination of hardware and software. In a preferred embodiment, the alarm generator comprises a "C" or "C++" language program running on the UNIX operating system on a SUN workstation.

C. The alarm feeder

A second component, called an alarm feeder, reads additional user input that specifies the nature of an event. For example, if the user-defined event is a fiber cut in a transmission system, the user-specified nature of this event can be (1) a full and immediate outage, (2) a full but cascading outage, or (3) a partial outage. This user input is optional, as default processing can be performed. The alarm feeder reads the alarms file, which was generated by the alarm generator, and determines the sequencing and timing of each alarm. It then feeds the alarms, in specific order and time intervals, to a communications emulator. As will be recognized by those skilled in the art, the alarm generator can be any combination of hardware and software. In a preferred embodiment, the alarm generator comprises a "C" or "C++" language program running on the UNIX operating system on a SUN workstation.

D. The communications emulator

A third component, called a communications emulator, emulates the actual communications of a network with the centralized system under test. It receives the sequenced alarms from the alarm feeder. It formats the sequenced alarms into data messages in accordance with the specific type of devices being emulated. Finally, it transmits the messages to the centralized system under test using an appropriate communications protocol. As will be recognized by those skilled in the art, the alarm generator can be any combination of hardware and software. In a preferred embodiment, the alarm generator comprises a "C" or "C++" language program running on the UNIX operating system on a SUN workstation.

II. The restoration network architecture

A. An example restoration network architecture

Figure 1A:
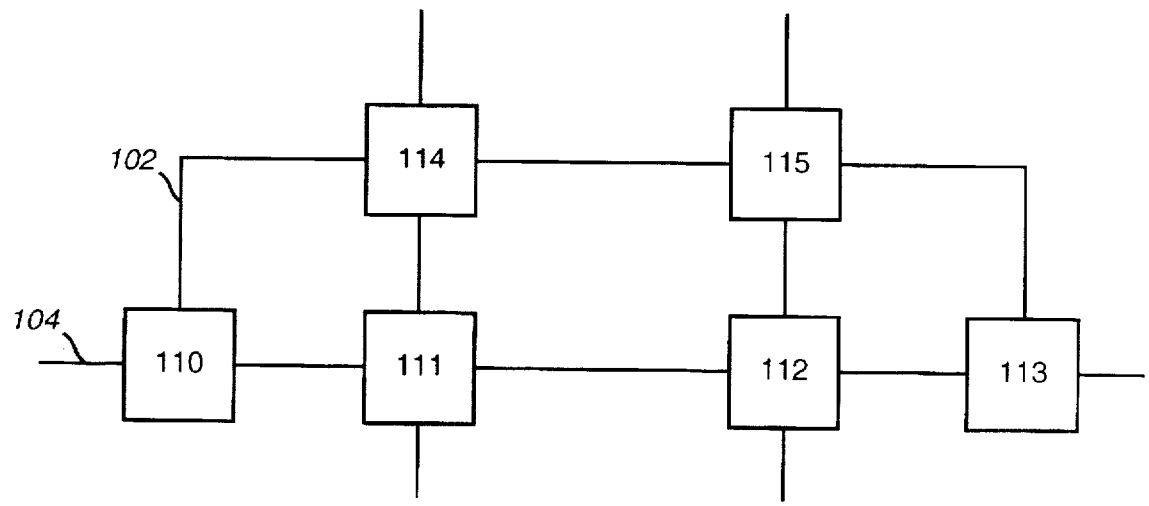
FIGS. 1A and 1B are block diagrams depicting examples of a restoration network architecture.

FIG. 1A illustrates an example of a restoration network architecture. Specifically, FIG. 1A represents a small portion of a complete restoration network, showing trunks 102 between nodes 110–115, and trunks 104 to other nodes of the network (not shown).

Nodes 110–115 represent telecommunications switching devices used for restoration. An exemplary switching device is a Digital Cross Connect (DXC) 3/3. While a typical network consists of many different types of nodes (M13 sites, digital repeater sites, switch sites, etc.), certain types of nodes are used for network restoration. For example, DXCs are devices that switch trunks based on external commands. Certain types of DXCs, such as a DXC 3/3 which switches DS-3 level trunks, are especially useful for network restoration. Thus, DXC devices are generally considered as restoration nodes. For the preferred embodiment, a node refers to a telecommunications switching device, such as a DXC 3/3, used for network restoration.

Internode trunks 102 are traffic links, such as DS-3 trunks, which are of interest in network restoration. In a typical telecommunications network, in the event of a network outage, DS-3 trunks are switched among various DXC 3/3 nodes to re-route traffic to circumvent the outage.

B. The centralized system

Figure 1B:
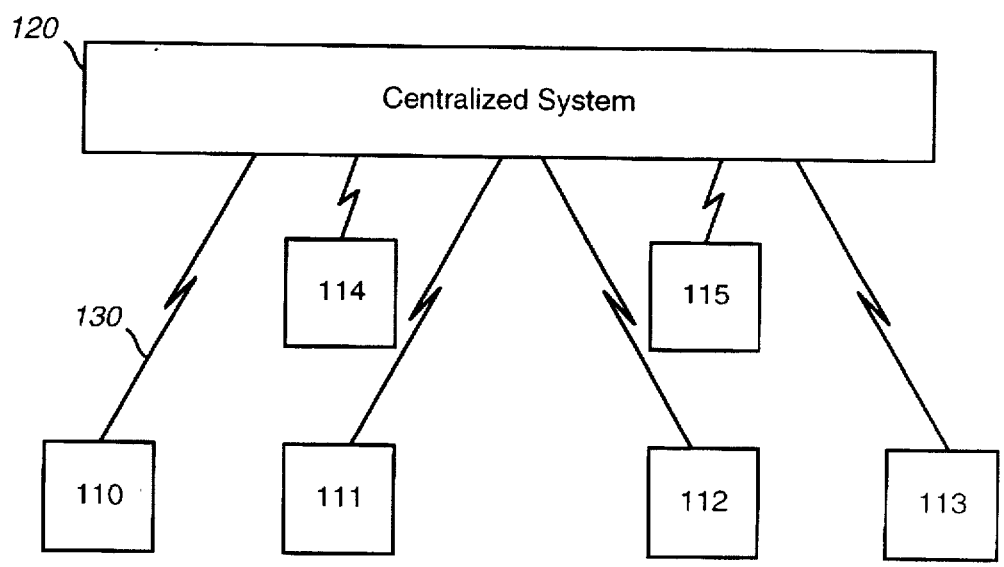

FIG. 1B illustrates the same restoration network architecture, only showing the connectivity of each node to a centralized system 120. The centralized system 120 is a computer system that is used for monitoring and control of the restoration network. It is connected to each node 110–115 via data communications circuits 130. In a preferred embodiment, these circuits are X.25 binary data links, although those skilled in the art will recognize that any comparable communications link is feasible. There are dual redundant links to each device. There also may exist backup communications between the centralized system 120 and each node 110–115. This can be realized with dedicated data links from the centralized system 120 to site controllers at each node.

The data communications links 130 between the centralized system 120 and each node 110–115 are used to pass data messages back and forth between the centralized system 120 and each node 110–115. These messages are used for several functions.

The centralized system 120 provisions the nodes of the restoration network with configuration data. It also audits the nodes for current states and configurations.

In the event of an outage, various nodes generate alarms and send these alarms in messages to the centralized system 120. The centralized system 120 then (1) analyzes the alarms to determine if an outage has occurred, (2) isolates the location of the outage, (3) builds restoral routes using spare capacity in the restoration network, and (4) sends messages to various nodes to implement restoral routes. These messages contain the actions needed, such as port cross-connects and disconnects, for each node to implement restoral routes. The nodes then send messages back to the centralized system 120 confirming each action as having successfully completed or failed.

The centralized system 120 represents any computer system that is used to monitor and control the restoration network. It may comprise many different systems, including restoration systems, on many different computers or a single computer. A centralized system 120 is usually continually improved throughout the year. In addition to the initial roll-out of a centralized system 120, a telecommunications service provider typically introduces several versions each year. These versions include new features and capabilities, as well as fixes to software defects, and comprise complex software.

As with any complex software system, the centralized system 120 requires extensive testing. In addition to testing the functionality of the centralized system, stress testing is also required to test the centralized system's behavior in a real-world environment.

To perform this testing, the restoration network, comprising nodes 110–115, inter-node trunks 102, and other nodes and trunks not shown in FIGS. 1A and 1B, are emulated by the present invention. An entire network of realistic proportions (i.e., hundreds of nodes and thousands of trunks) can be emulated, overcoming the previously-mentioned problems of known emulators.

III. An overview of the physical architecture of the present invention

Figure 2:
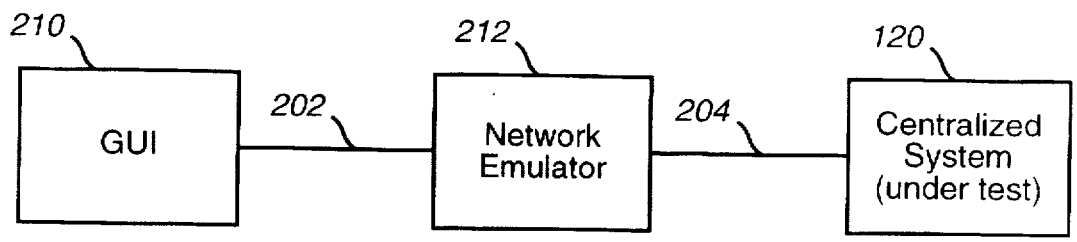
FIG. 2 is a block diagram depicting an overview of the physical architecture of the present invention.

FIG. 2 illustrates the physical architecture of the present invention used in its preferred mode. The invention is a network emulator 212 that can be run on virtually any type of computer, including a PC. It accepts user input by providing a graphical user interface (GUI) 210. In the preferred embodiment, the network emulator 212 and the GUI 210 are realized on the same computer, such as a PC with monitor and keyboard. Here, the means 202 for providing user input data to the network emulator 212 may be realized by standard inter-process communications, such as shared memory. As recognized by those skilled in the art, however, network emulator 212 and GUI 210 need not be provided on the same computer.

The network emulator 212 is connected to the centralized system 120. Centralized system 120 is being tested via data communications link 204. In the preferred embodiment, this link is of the same type as used in the actual network, such as an X.25 binary data link, although those skilled in the art will recognize that there is no requirement that the data links be of the same type.

IV. A detailed view of the preferred embodiment

A. A Logical Architecture for the Invention

Figure 3:
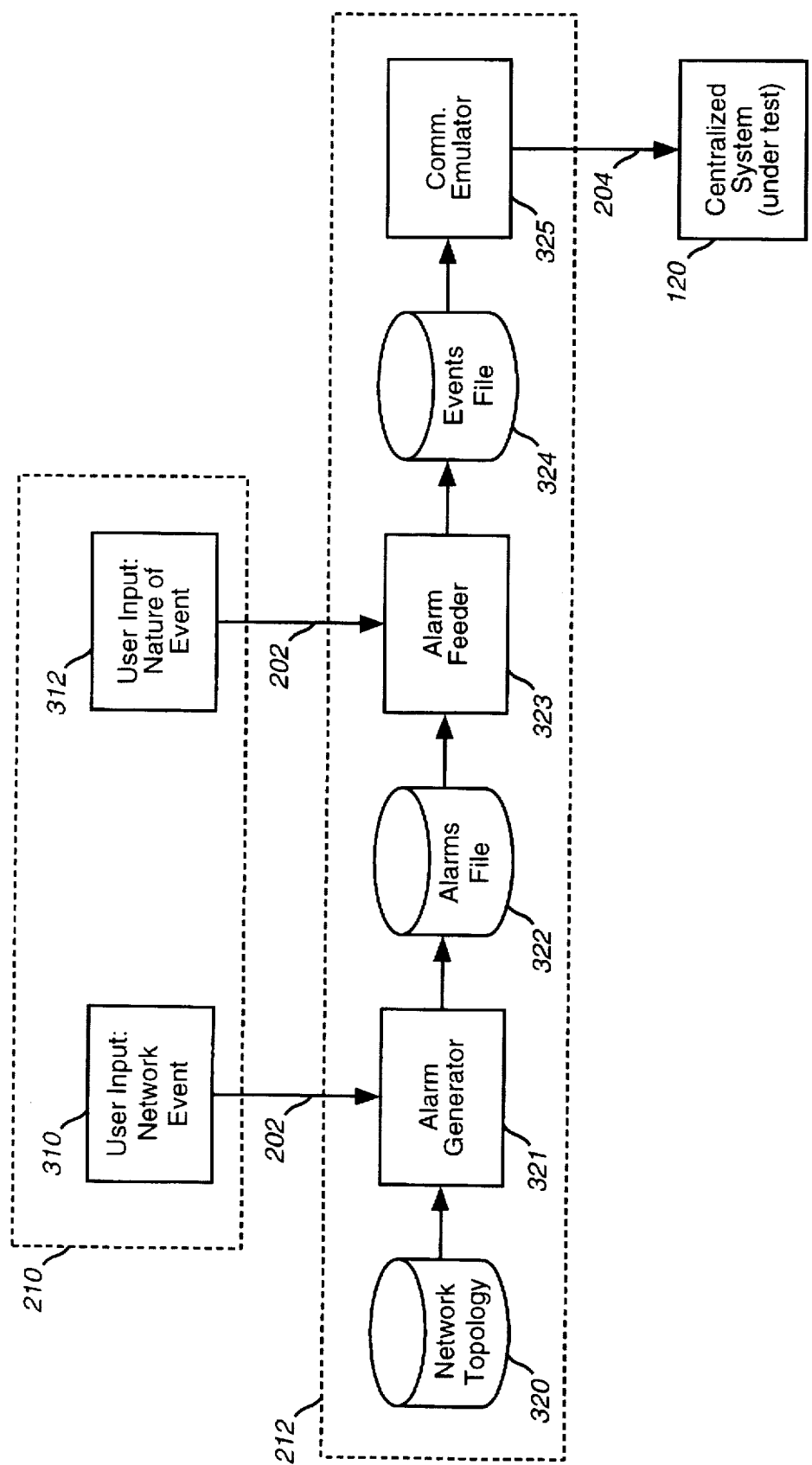
FIG. 3 is a block diagram depicting a detailed view of the logical architecture of the present invention.

FIG. 3 illustrates the logical architecture of a preferred embodiment of the present invention. FIG. 3 illustrates GUI 210, network emulator 212 and centralized system 120 (under test).

GUI 210 includes a user input for network event 310. It also includes a user input for a nature of an event 312.

Network emulator 212 consists of three primary process components: alarm generator 321, alarm feeder 323, and communications emulator 325. Network emulator 212 uses network topology database 320 and generates alarms file 322 and events file 324. Network emulator 212 receives input from GUI 210 and outputs data to centralized system 120 (under test).

B. An Example Implementation for the Invention

The present invention, namely the network emulator 212, may be implemented using hardware, software or a combination thereof and may be implemented in a computer system or other processing system. In fact, in one embodiment, the invention is directed toward a computer system capable of carrying out the functionality described herein.

Figure 4:
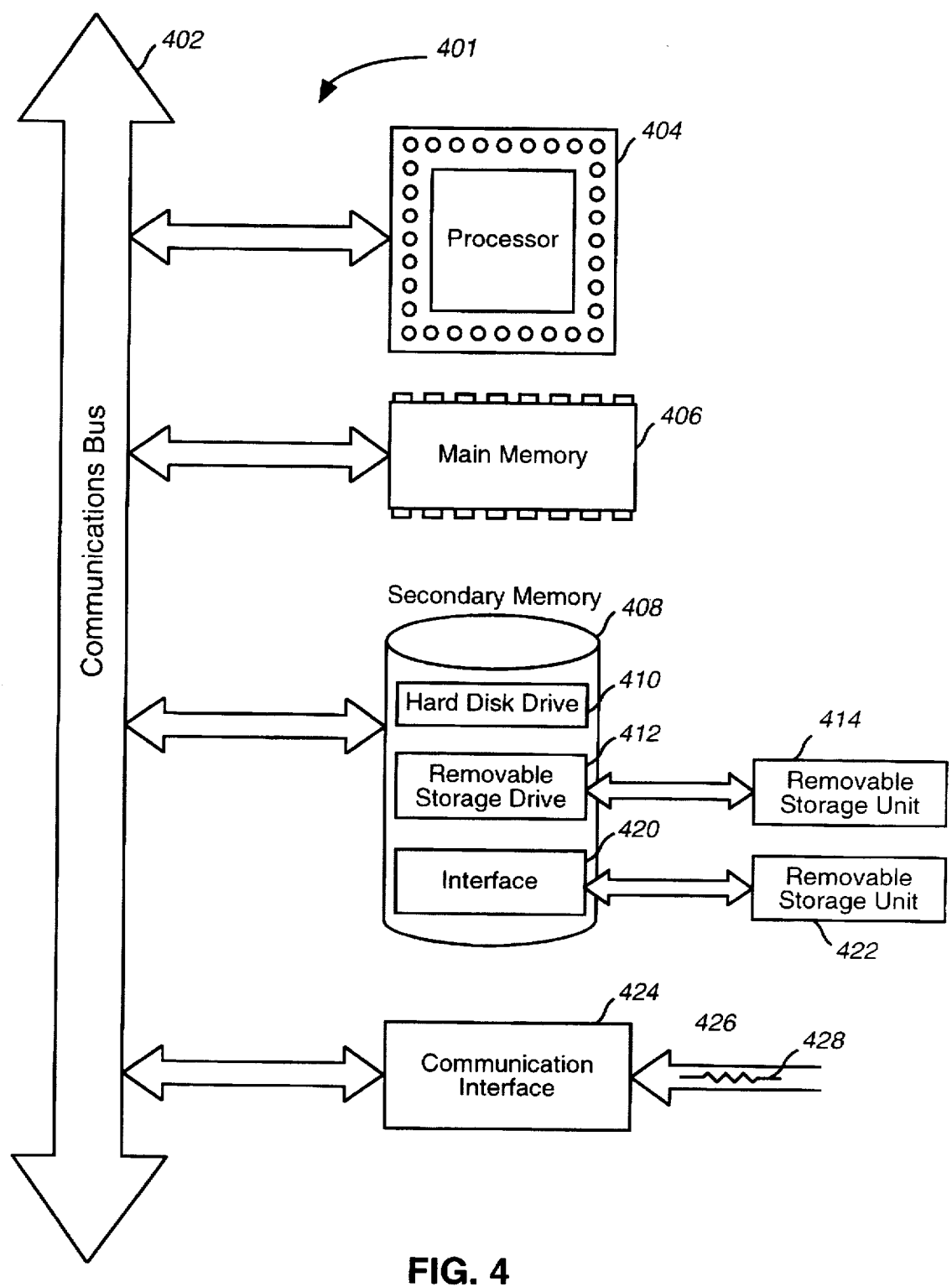
FIG. 4 is a block diagram of a computer useful for implementing components of the present invention.

An example computer system 401 is shown in FIG. 4. The computer system 401 includes one or more processors, such as processor 404. The processor 404 is connected to a communication bus 402. Various software embodiments are described in terms of this example computer system. After reading this description, it will become apparent to a person skilled in the relevant art how to implement the invention using other computer systems and/or computer architectures.

Computer system 402 also includes a main memory 406, preferably random access memory (RAM), and can also include a secondary memory 408. The secondary memory 408 can include, for example, a hard disk drive 410 and/or a removable storage drive 412, representing a floppy disk drive, a magnetic tape drive, an optical disk drive, etc. The removable storage drive 412 reads from and/or writes to a removable storage unit 414 in a well known manner. Removable storage unit 414, represents a floppy disk, magnetic tape, optical disk, etc. which is read by and written to by removable storage drive 412. As will be appreciated, the removable storage unit 414 includes a computer usable storage medium having stored therein computer software and/or data.

In alternative embodiments, secondary memory 408 may include other similar means for allowing computer programs or other instructions to be loaded into computer system 401. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 401.

Computer system 401 can also include a communications interface 424. Communications interface 424 allows software and data to be transferred between computer system 401 and external devices. Examples of communications interface 424 can include a modem, a network interface (such as an Ethernet card), a communications port, a PCM-CIA slot and card, etc. Software and data transferred via communications interface 424 are in the form of signals which can be electronic, electromagnetic, optical or other signals capable of being received by communications interface 424. These signals 426 are provided to communications interface via a channel 428. This channel 428 carries signals 426 and can be implemented using wire or cable, fiber optics, a phone line, a cellular phone link, an RF link and other communications channels.

In this document, the terms "computer program medium" and "computer usable medium" are used to generally refer to media such as removable storage device 412, a hard disk installed in hard disk drive 410, and signals 426. These computer program products are means for providing software to computer system 401.

Computer programs (also called computer control logic) are stored in main memory and/or secondary memory 408. Computer programs can also be received via communications interface 424. Such computer programs, when executed, enable the computer system 401 to perform the features of the present invention as discussed herein. In particular, the computer programs, when executed, enable the processor 404 to perform the features of the present invention. Accordingly, such computer programs represent controllers of the computer system 401.

In an embodiment where the invention is implemented using software, the software may be stored in a computer program product and loaded into computer system 401 using removable storage drive 412, hard drive 410 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

C. The function of the alarm generator

Figure 5:
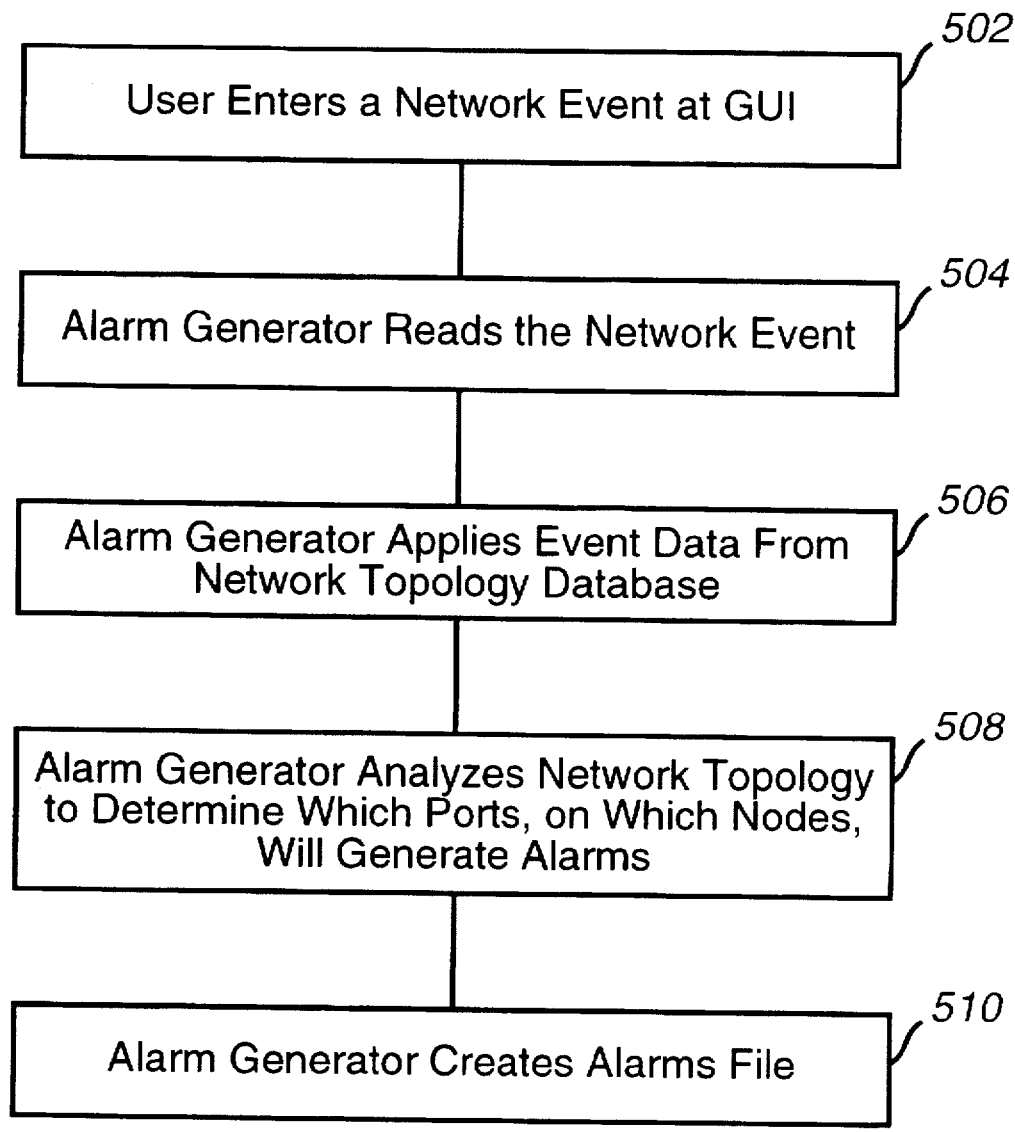
FIG. 5 is a flowchart illustrating the function of the inventive alarm generator.

FIG. 5 is a flowchart illustrating how alarms file 322 is generated by the alarm generator 321. In step 502, a user enters one or more network events 310 at GUI 210. Examples of user-input network events include a transmission outage between two sites, an equipment failure at a site, an entire site failure that includes all the equipment at that site, and combinations of events. Those skilled in the art will recognize, however, that network events are not limited to this list.

In step 504, the alarm generator 321 reads in one or more of the user-input network events 310. These network events 310 were entered by the user in step 502.

In step 506, the alarm generator 321 retrieves network data from a network topology database 320. The network topology database 320 contains data that reflects the topology of the network. This data includes identification of each node, the type of each node, the interconnectivity between the nodes, and the frequency bandwidth capacity for trunks between the nodes. The network topology database 320 may be part of the network emulator 212, as shown in the preferred embodiment of FIG. 3, or it may reside on an external computer. If it resides on an external computer, then a means for the alarm generator 321 to access the network topology database 320 can be provided, as recognized by those skilled in the art.

In step 508, the alarm generator 321 analyzes the network topology data retrieved from the network topology database 320 in order to determine which ports, on which nodes, will generate alarms in response to the user-input network event 310. For example, if the user specifies a transmission cut to a particular fiber cable between two sites, the alarm generator 321 will determine from the network topology database 320 the trunks that are impacted, and the ports on the nodes that support these trunks.

As those skilled in the art will recognize, there are many different types of alarms that can be generated. For example, a total loss of signal (TLOS) can be used to generate one type of alarm, whereas a partial loss of signal (PLOS) can be used to generate another type of alarm. Alarm generator 321 can determine the different types of alarms that are to be generated.

In step 510, the alarm generator 321 creates an alarms file 322, specifying each alarm that is generated, and optionally, the type of each alarm that is generated. As alluded to above, the alarms file 322 identifies (1) the node and port that generates each alarm, (2) the trunks that correspond to the ports that generate an alarm, and (3) the logical order of the ports on each trunk. As recognized by those skilled in the art, the alarm generator 321 can be programmed to specify any other data in the alarms file 322 that can be derived from the network topology database 320.

D. The function of the alarm feeder

Figure 6:
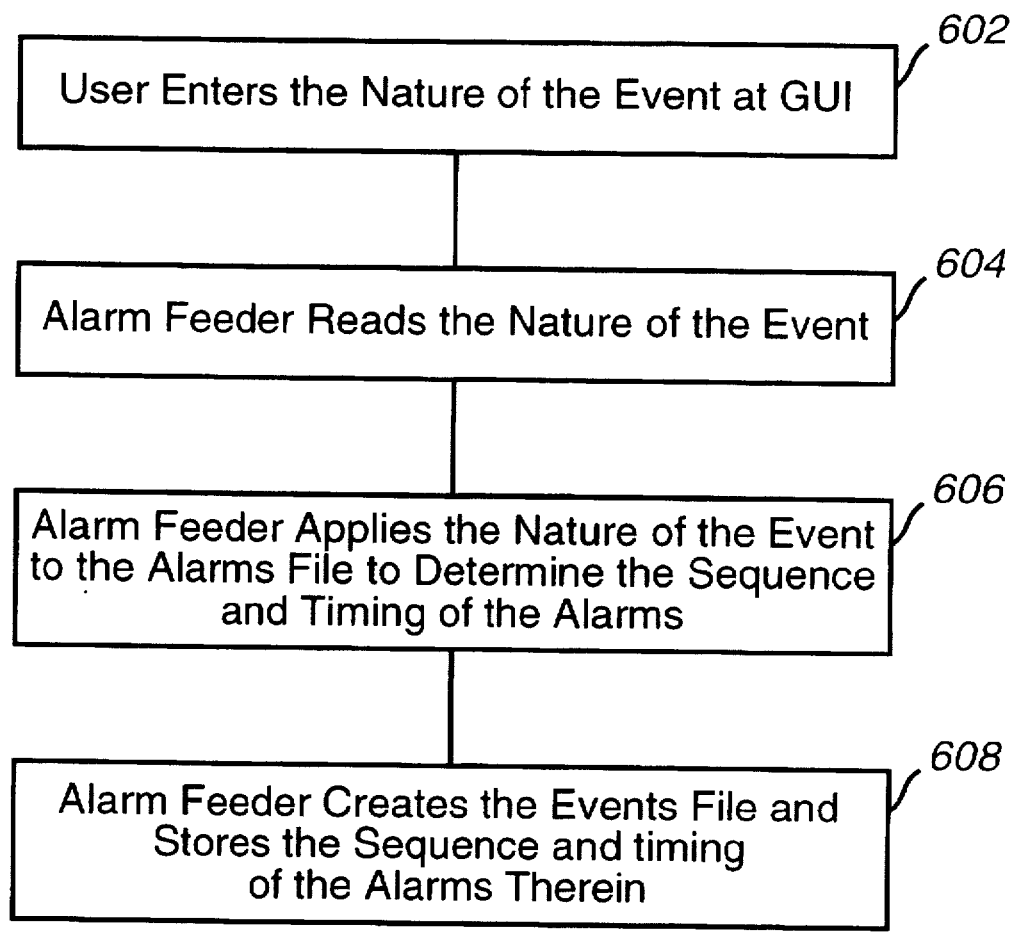
FIG. 6 is a flowchart illustrating the function of the inventive alarm feeder.

FIG. 6 is a flowchart illustrating how events file 324 is generated by the alarm feeder 323. In step 602, a user enters the nature of the event 312 at GUI 210. The nature of an event defines, for example, if an outage is full or partial, or if an outage is instant or cascading. User input 312 is optional because default natures can be applied to each type of network event.

In step 604, the alarm feeder 323 reads in the user-input nature of the event 312. The nature of the event 312 was entered by the user in step 602.

In step 606, the alarm feeder 323 applies this input 312 to the alarms file 322 to determine the sequence and timing of alarms generated by the failed network devices. The sequence and timing of the alarms refers to the sequence in which the alarms are to be generated at given nodes, as well as the time intervals between the generation of the alarms. Specifically, it refers to the sequence of alarms at the ports that support each impacted trunk ending at the nodes, as well as the time between the generation of alarms at these ports. Alarm feeder 323 references the alarms file 322 and identifies the ports that support each trunk that is impacted, sequencing the alarms from these ports according to the user-input nature of the event 312.

The alarm feeder 323 can provide a sequence for the alarms according to the physical sequence of ports of each trunk from the point of the outage. It can introduce delays between alarms on different trunks to span the length of the outage interval specified by the user (i.e., in the user-input nature of the event 312). The alarm feeder 323 can introduce delays between alarms from different ports along the same trunk to emulate both transmission delays between geographically dispersed nodes and the centralized system 120, and delays in detecting the outage due to different distances of ports from the point of the outage.

The alarm feeder 323 can also emulate specific behavior of a restoration network in response to an event. For example, some network devices may be programmed with delays, so that if an outage is detected by a port, a timer is set and must expire before that device generates an alarm. These delays are introduced by the alarm feeder 323. The alarm feeder 323, when it reads from the alarms file 322 that a certain port on a certain device has generated an alarm, will add a given delay to that alarm if it knows that the particular device has the given delay programmed into it for such alarms.

In step 608, the alarm feeder 323 creates an events file 324 and stores therein the sequence and timing of each alarm. Specifically, the alarm feeder 323 feeds the alarms to the events file 324 in sequence in accordance with the determinations made in step 606.

E. An example illustrating the methods of FIGS. 5 and 6

Suppose that in step 502 a user specifies as input 310 a full outage to a fiber cable between a first site and a second site. In step 504, the alarm generator 321 reads in this information.

In step 506, the alarm generator 321 references the network topology database 320 to identify the trunks supported by this fiber cable, the nodes along each impacted trunk, and the ports of each impacted trunk.

In step 508, the alarm generator 321 determines which ports on which nodes will generate alarms, and in step 510 the alarm generator 510 specifies this information in the alarms file 322.

In step 602, the user enters the nature of the event as input 312 at GUI 210. For example, the user specifies in input 312 that this outage will take 15 seconds to complete (perhaps emulating a slowly burning cable), and specifies the order in which the DS-3 trunks will fail. In step 604, the alarm feeder 323 reads this information.

In step 606, the alarm feeder 323 uses this input to determine when each alarm specified in the alarms file 322 will be sent. The alarm feeder 323 identifies each trunk, specified by the user, in the alarms file 322, along with the corresponding ports that have generated the alarms.

The alarm feeder 323 feeds these alarms to the events file 324 in sequence in accordance with the sequence of trunks specified by the user in input 312, and the sequence of ports along each trunk from the point of the outage. It introduces delays between alarms on different trunks to span the 15 second outage interval specified by the user.

The alarm feeder 323 can introduce delays between alarms from different ports along the same trunk to emulate both transmission delays between geographically dispersed nodes and the centralized system 120, and delays in detecting the outage due to different distances of ports from the point of the outage.

The alarm feeder 323 can also emulate specific behavior of a restoration network in response to the event. Assuming that some network devices may be programmed with delays, the delays are introduced by the alarm feeder 323. When alarm feeder 323 reads from the alarms file 322 that a certain port on a certain device has generated an alarm, it will add, for example, a 5-second delay to that alarm (i.e., if it knows that the particular device has a 5-second delay programmed into it for such alarms).

F. The function of the communications emulator

The communications emulator 325 performs the actual emulation of the network in testing the centralized system 120, emulating the data communications between the network and the centralized system 120. The communications emulator 325 takes the alarms from the events file 324, formats them into data messages in accordance with the type of device being emulated, and sends the messages to the centralized system 120 over data link 204 using the appropriate communications protocol. In this way, the communications emulator 325 can simulate the activity of actual nodes sending alarm signals to the centralized system 120.

Because the complexity of event analysis and alarm generation has been removed from the communications emulator 325 and placed in the other components, the communications emulator 325 can be easily modified to accommodate different types of message formats and protocols that are introduced when new types of devices are added to the network.

Because the communications emulator 325 does not need to perform event analysis and alarm generation, during emulation it can have the dedicated use of the network emulator's resources (CPU, RAM, etc.) to format and send messages. All other processing required has been completed prior to emulation. Thus, the network emulator 212 can generate and send messages to the centralized system 120 with the same (or comparable) speed and performance as an actual network.

V. Conclusion

In summary, the network emulator can more closely emulate the performance of an actual network than existing emulators. The communications emulator 325 is provided with data representing the behavior of the network in response to a network event. This data is produced prior to emulation by the alarm generator 321 and alarm feeder 323, and is contained in the events file 324. To actually begin emulation, the communications emulator 325 simply formats and sends alarm messages, without the hindrance of other processes competing for the network emulator computer's resources. The inventive network emulator also provides the user with ease of use in defining network events. In addition, the network emulator is more easily maintained and modified than known emulators, due to the segmentation of its process components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing network emulation, using a segmented functional architecture, of one or more network events causing a disruption of service between two or more nodes in a network, comprising:

providing a user-defined network event;

analyzing a topology of the network in order to ascertain one or more ports on one or more trunks located between the nodes that will generate alarms in response to said user-defined network event, and placing a result of said analysis into an alarms object;

providing a user-defined nature of event for said user-defined network event;

applying said user-defined nature of event to said alarms object to determine a timing and sequence of said alarms, and placing information relating to said timing and sequence into said events object; and applying said events object to a centralized system managing restoral function for the network.

2. The method of claim 1, wherein the step of providing a user-defined network event further comprises:

providing said user-defined network event to a graphical user interface.

3. The method of claim 1, wherein the step of providing a user-defined network event further comprises any one of:

providing a transmission outage between one or more nodes;

providing an entire node failure including all the equipment at a failed site; and a combination of providing a transmission outage between one or more nodes and providing an entire node failure.

4. The method of claim 1, wherein the step of analyzing a topology of the network further comprises:

searching a network topology database to determine the identification of each node stored therein, the type of each node stored therein, and the interconnectivity between the nodes stored therein.

5. The method of claim 1, wherein the step of analyzing a topology of the network further comprises:

determining one or more different types of said alarms.

6. The method of claim 1, wherein the step of providing a user-defined nature of event further comprises:

providing said user-defined nature of said network event to a graphical user interface.

7. The method of claim 1, wherein the step of providing a user-defined nature of event further comprises providing any one of:

whether said user-defined network event is partial or full in nature; and whether said user-defined network event is instant or cascading in nature.

8. The method of claim 1, wherein the step of applying said user-defined nature of event to said alarms object further comprises:

determining a sequence of said alarms at said ports and a time interval between any two of said alarms.

9. The method of claim 8, further comprising:

determining said sequence of said alarms according to the physical distance of said ports from a point of outage.

10. The method of claim 8, further comprising:

introducing delays between said alarms to emulate transmission delays for physical separations between said ports and said centralized system.

11. The method of claim 8, further comprising:

introducing a pre-determined timing delay to any one of said alarms if said alarm is generated for a device having said pre-determined timing delay.

12. The method of claim 1, wherein the step of applying said events object to a centralized system further comprises:

retrieving said alarms from said events object, formatting said alarms into data messages in accordance with devices being emulated, and transmitting said data messages to said centralized system.

13. A system for providing network emulation, using a segmented functional architecture, of one or more network events causing a disruption of service between two or more nodes in a network, comprising:

means for providing a user-defined network event;

means for analyzing a topology of the network in order to ascertain one or more ports on one or more trunks located between the nodes that will generate alarms in response to said user-defined network event, and placing a result of said analysis into an alarms object;

means for providing a user-defined nature of event for said user-defined network event;

means for applying said user-defined nature of event to said alarms object to determine a timing and sequence of said alarms, and for placing information relating to said timing and sequence into an events object; and means for applying said events object to a centralized system managing restoral function for the network.

14. The system of claim 13, wherein said means for providing a user-defined network event is a graphical user interface, and wherein said user-defined network event comprises one of:

a transmission outage between one or more nodes;

an entire node failure including all the equipment at a failed site; and a combination of a transmission outage between one or more nodes and an entire node failure.

15. The system of claim 13, wherein said means for analyzing a topology of the network further comprises:

means for searching a network topology database to determine the identification of each node stored therein, the type of each node stored therein, and the interconnectivity between the nodes stored therein; and means for determining one or more different types of said alarms.

16. The system of claim 13, wherein said means for providing a user-defined nature of event is a graphical user interface, and wherein said user-defined nature of event comprises:

means for determining whether said event is partial or full in nature; and means for determining whether said event is instant or cascading in nature.

17. The system of claim 13, wherein said means for applying said user-defined nature of event to said alarms object further comprises:

means for determining a sequence of said alarms at said ports and a time interval between any two of said alarms.

18. The system of claim 17, further comprising:

means for determining said sequence of said alarms according to the physical distance of said ports from a point of outage;

means for introducing delays between said alarms to emulate transmission delays for physical separations between said ports and said centralized system; and means for introducing a pre-determined timing delay to any one of said alarms if said alarm is generated for a device having said pre-determined timing delay.

19. The system of claim 13, wherein the step of applying said events object to a centralized system further comprises:

means for retrieving said alarms from said events object;

means for formatting said alarms into data messages in accordance with devices being emulated; and means for transmitting said data messages to said centralized system.

20. A system for providing network emulation, using a segmented functional architecture, of one or more network events causing a disruption of service between two or more nodes in a network, comprising:

a network event input device which permits a user to provide a user-defined network event;

an alarm generator for analyzing a topology of the network in order to ascertain one or more ports on one or more trunks located between the nodes that will generate alarms in response to said user-defined network event, and places a result of said analysis into an alarms object;

a nature of event input device which permits a user to provide a user-defined nature of event for said user-defined network event;

an alarm feeder which applies said user-defined nature of event to said alarms object to determine a timing and sequence of said alarms, and places information relating to said timing and sequence into an events object; and a communications emulator which applies said events object to a centralized system managing restoral function for the network.

21. A computer program product for providing network emulation, using a segmented functional architecture, of one or more network events causing a disruption of service between two or more nodes in a network, wherein said computer program product comprises a computer useable medium having computer program logic stored therein, said computer program logic comprises:

means for enabling a computer to provide a user-defined network event;

means for enabling a computer to analyze a topology of the network in order to ascertain one or more ports on one or more trunks located between the nodes that will generate alarms in response to said user-defined network event, and to place a result of said analysis into an alarms object;

means for enabling a computer to provide a user-defined nature of event for said user-defined network event;

means for enabling a computer to apply said user-defined nature of event to said alarms object to determine a timing and sequence of said alarms, and to place information relating to said timing and sequence into an events object; and means for enabling a computer to apply said events object to a centralized system managing restoral function for the network.

* * * * *